US012725720B2

(12) United States Patent
Tanaka et al.

(10) Patent No.: US 12,725,720 B2
(45) Date of Patent: Sep. 1, 2026

(54) CONDUCTOR MEMBER WITH COOLING STRUCTURE

(71) Applicant: Yazaki Corporation, Tokyo (JP)

(72) Inventors: Hiroyuki Tanaka, Kakegawa (JP); Kazuki Shirosaka, Kakegawa (JP); Junya Higashi, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 215 days.

(21) Appl. No.: 18/885,003

(22) Filed: Sep. 13, 2024

(65) Prior Publication Data

US 2025/0104885 A1 Mar. 27, 2025

(30) Foreign Application Priority Data

Sep. 27, 2023 (JP) ................................ 2023-165962

(51) Int. Cl.
*H01B 7/42* (2006.01)

(52) U.S. Cl.
CPC .................................... *H01B 7/423* (2013.01)

(58) Field of Classification Search
CPC ...................................................... H01B 7/423
USPC ............................................... 174/15.1, 16.2
See application file for complete search history.

(56) References Cited

U.S. PATENT DOCUMENTS

| | | | | |
|---|---|---|---|---|
| 2013/0161307 A1* | 6/2013 | Bohlender | ............... | H05B 3/30 219/202 |
| 2019/0159367 A1 | 5/2019 | Umino | | |
| 2023/0044486 A1* | 2/2023 | Hanano | .................. | F28D 15/00 |

FOREIGN PATENT DOCUMENTS

| | | |
|---|---|---|
| JP | 2014-011086 A | 1/2014 |
| JP | 2014-195392 A | 10/2014 |
| JP | 2020-127302 A | 8/2020 |
| JP | 2021-082505 * | 5/2021 |
| JP | 2023-126992 * | 9/2023 |

* cited by examiner

*Primary Examiner* — Chau N Nguyen
(74) *Attorney, Agent, or Firm* — Sughrue Mion, PLLC

(57) ABSTRACT

A conductor member with cooling structure includes a conductor plate, a groove member formed of an insulation resin, having a shape in which a flow path groove configuring part of a refrigerant flow path in which refrigerant flows and extending along at least a partial shape of the conductor plate in a length direction; a metal cover as a cover made from metal to configure the refrigerant flow path by blocking a groove opening of the flow path groove in the groove member, the metal cover being overlapped by the conductor plate; a pair of refrigerant inlet/outlet ports provided in the metal cover; and a thermal conduction material being sandwiched between the metal cover and the conductor plate to be in close contact with the metal cover and the conductor plate.

6 Claims, 3 Drawing Sheets

CONDUCTOR MEMBER WITH COOLING STRUCTURE

TECHNICAL FIELD

The present invention relates to a conductor member with cooling structure that connects component terminals of electrical and electronic components as an electrical connection target while performing cooling to itself.

BACKGROUND ART

Conventionally, a cooling structure configured to transfer heat of a conductor member connected to component terminals, as an electrical connection target, of an electrical and electronic component to a bottom wall of a device housing to dissipate the heat is known (for example, see Patent Document 1). The cooling structure according to Patent Document 1 is configured as a structure to transfer the heat of the conductor member that is made of metal to the bottom wall via an insulation member so as to prevent electrical leakage and perform the heat dissipation of the conductor member.

CITATION LIST

Patent Documents

[Patent Document 1] JP 2020-127302A

SUMMARY OF THE INVENTION

Technical Problem

Here, for the conductor member with cooling structure adopting the cooling structure that dissipates heat from a bottom wall of the device housing described above, it is necessary to form the bottom wall with a sufficient thickness and width for heat dissipation such that the weight thereof tends to be heavy and the dimension thereof tends to be large.

Accordingly, the present invention is focused on the above-described technical problem and an object of the present invention is to provide a conductor member with cooling structure which can achieve the light reduction and the miniaturization.

Solution to Problem

In order to solve the above-identified problem, a conductor member with cooling structure is characterized by including a conductor plate formed of a conductive metal in a stripe shape, wherein one end side is connected to a component terminal of a predetermined electrical/electronic member, and the other end side is connected to an electrical connection target of the electrical/electronic member to be energized; a groove member formed of an insulation resin, having a shape in which a flow path groove configuring part of a refrigerant flow path in which refrigerant flows and extending along at least a partial shape of the conductor plate in a length direction; a metal cover as a cover made from metal to configure the refrigerant flow path by blocking a groove opening of the flow path groove in the groove member, the metal cover being overlapped by the conductor plate; a pair of refrigerant inlet/outlet ports provided in at least one side of the groove member and the metal cover for the refrigerant to flow in the refrigerant flow path; and a thermal conduction material being sandwiched between the metal cover and the conductor plate to be in close contact with the metal cover and the conductor plate.

Effect of the Invention

According to the above-described conductor member with cooling structure, it is possible to achieve the light reduction and the miniaturization.

DESCRIPTION OF EMBODIMENTS

Hereinafter, an embodiment of a conductor member with cooling structure will be described.

Figure 1:
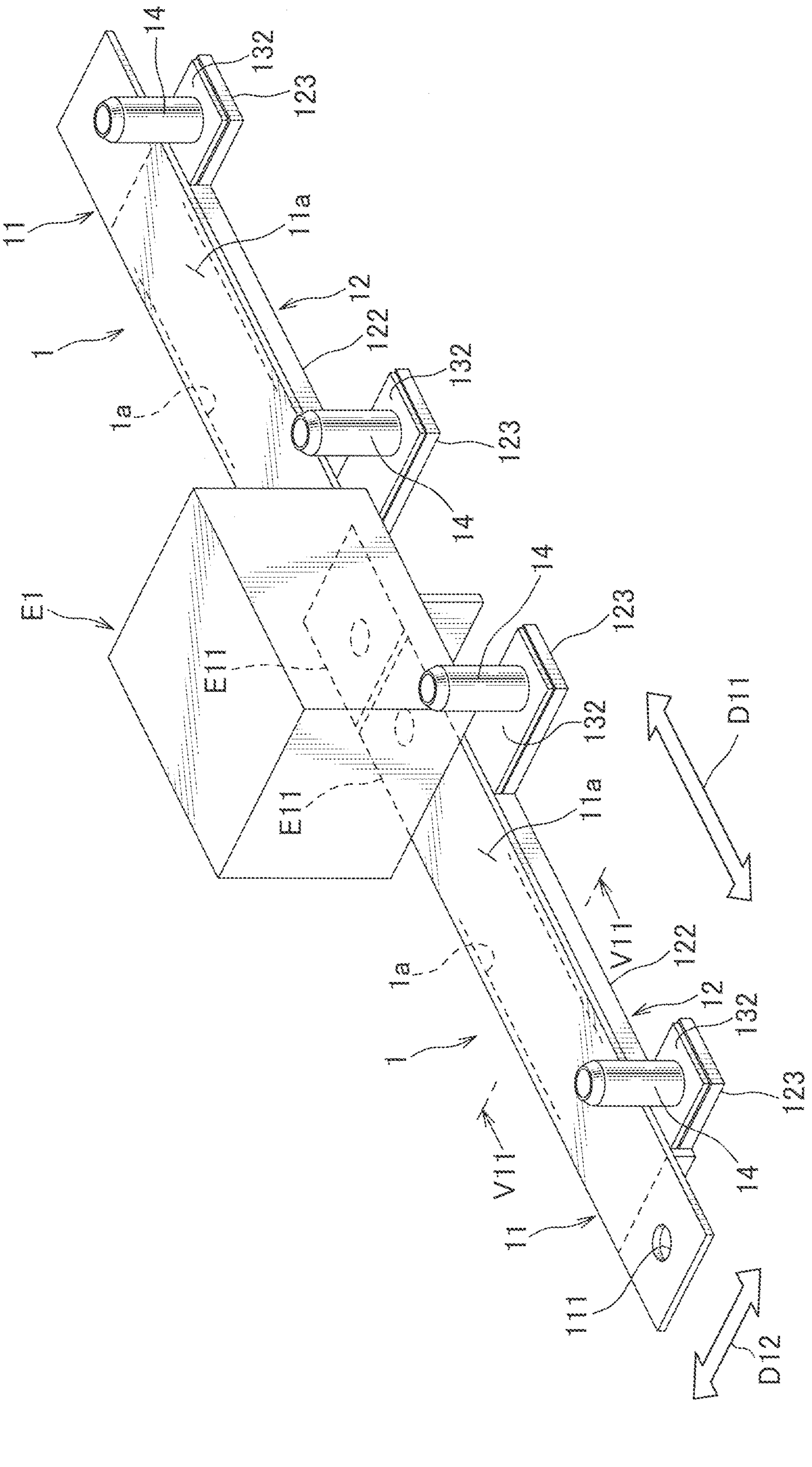
FIG. 1 is a perspective view showing a conductor member with cooling structure according to an embodiment.
Figure 2:
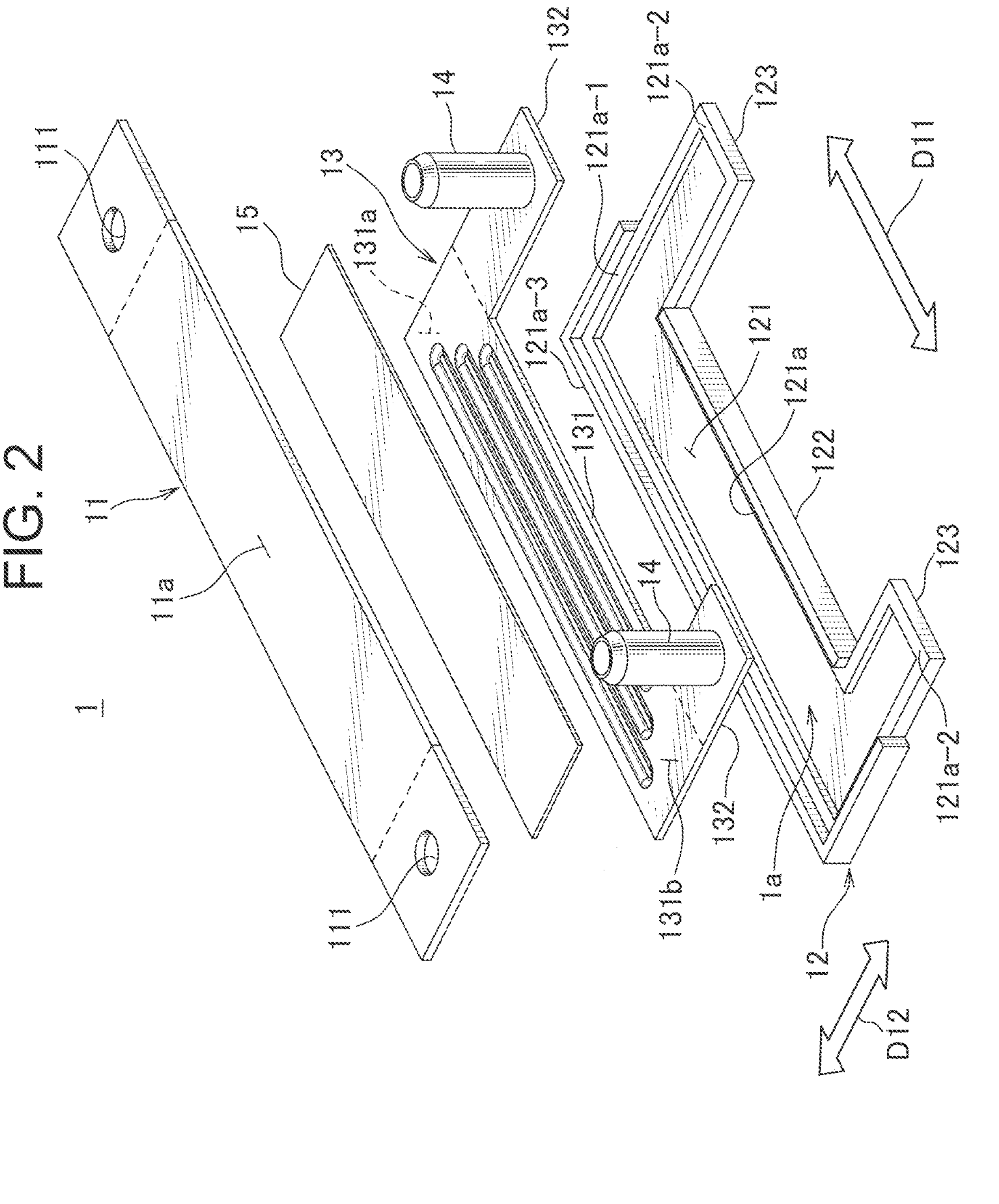
FIG. 2 is an exploded perspective view showing the conductor member with cooling structure shown in FIG. 1.
Figure 3:
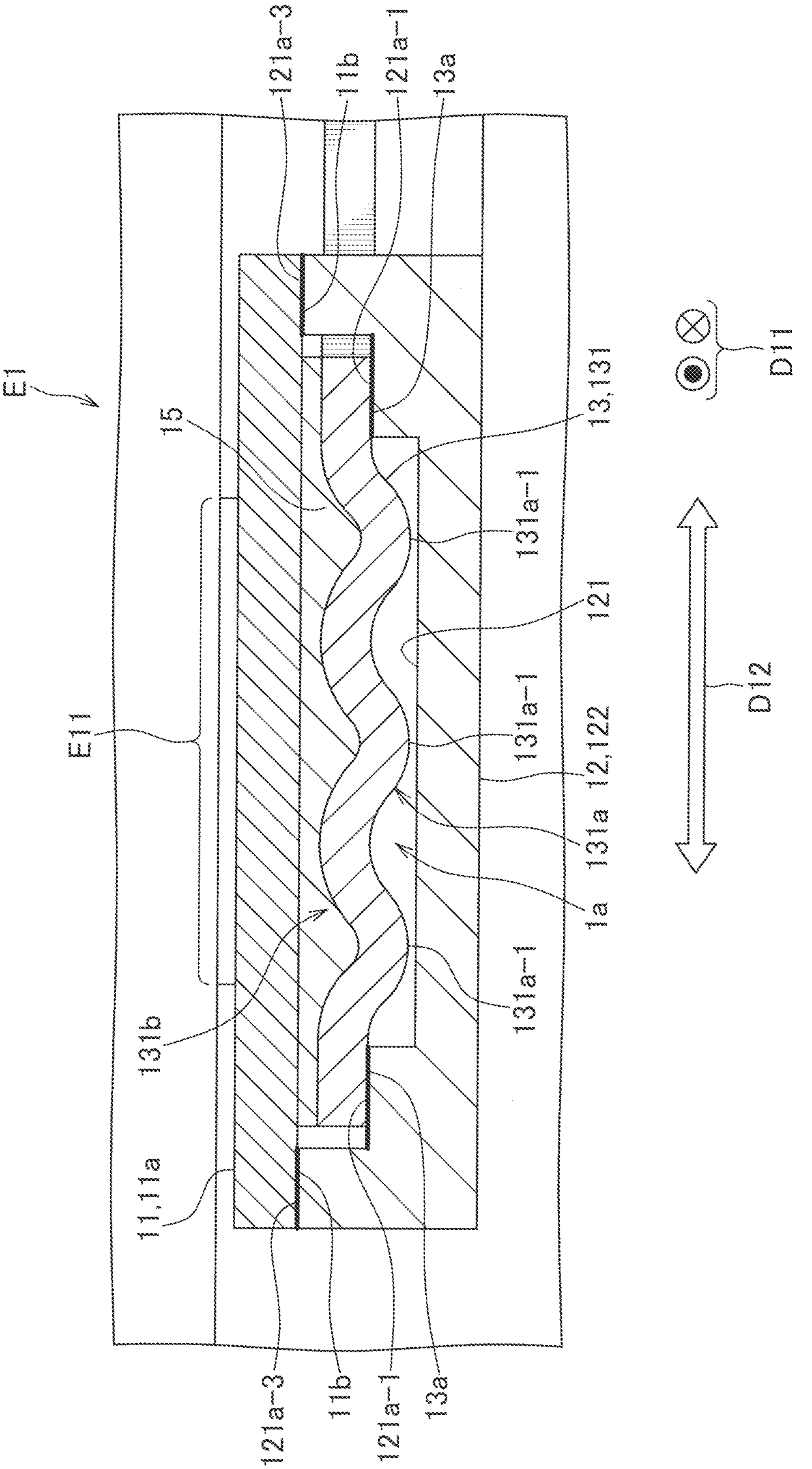
FIG. 3 is a cross-sectional view showing the conductor member with cooling structure taken along line V11-V11 in FIG. 1.

FIG. 1 is a perspective view showing a conductor member with cooling structure according to an embodiment. FIG. 2 is an exploded perspective view showing the conductor member with cooling structure shown in FIG. 1. FIG. 3 is a cross-sectional view showing the conductor member with cooling structure taken along line V11-V11 in FIG. 1.

A conductor member with cooling structure 1 according to the present embodiment is a member for connecting each component terminal E11 in a relay as an electrical/electronic member E1 to an electrical connection target of this electrical/electronic member E1. A pair of component terminals E11 are provided in the electrical/electronic member E1 and a pair of the conductor members with cooling structure 1 are provided in one-to-one correspondence with this pair of component terminals E11. Each conductor member with cooling structure 1 includes a conductor plate 11, a groove member 12, a metal cover 13, a pair of refrigerant inlet/outlet ports 14, and a thermal conduction material 15.

The conductor plate 11 is formed of a conductive metal such as copper and the like in a rectangular strip shape, wherein one end side thereof is connected to the component terminal E11 of a relay as the electrical/electronic member E1, and the other end side thereof becomes a busbar that is connected to an electrical connection target of the electrical/electronic member E1 to be energized. The connections of the two end portions are performed by the screw fastening and a screw penetration hole 111 for the fastening screw to penetrate is provided in each end portion.

The groove member 12 becomes a member formed of the insulation resin which extends along a partial shape 11*a* in the conductor plate 11 except for two end portions in the length direction D11, and has a shape in which the flow path groove 121 configuring part of the refrigerant flow path 1*a* in which the refrigerant flows is provided. This groove member 12 has a groove shape in a C shape in a planar view viewed from the conductor plate 11 side which has a central groove portion 122 along the partial shape 11*a* of the conductor plate 11 and a pair of protrusion groove portions 123 protruding outwardly in the width direction D12 of the conductor plate 11 from the two end portions of this central groove portion 122. The two end portions in the conductor plate 11 in which the screw penetration holes 111 are provided are disposed to project in the length direction D11 from the central groove portion 122 in the groove member 12.

The metal cover 13 is a cover made of the metal such as copper or the like that configures the refrigerant flow path 1*a* by blocking the groove opening 121*a* of the C-shaped flow path groove 121 in the groove member 12, and the metal cover 13 is a member on which the conductor plate 11 can overlap. This metal cover 13 has a C-shaped plate shape in a planar view viewed from the conductor plate 11 side including a central cover portion 131 blocking the central groove portion 122 and a pair of protrusion cover portions 132 protruding from the two end portions thereof to block the pair of protrusion groove portions 123 in one-to-one correspondence.

Here, according to the present embodiment, the above-described groove member 12 has a step concave shape such that part of the opening edge 121*a*-1 in the groove opening 121*a* except for the above-described protrusion groove portion 123 can be fitted into the central cover portion 131 of the metal cover 13. Regarding the protrusion opening edge 121*a*-2 of the protrusion groove portion 123, a contour thereof is formed in approximately the same shape with that of the protrusion cover portion 132 such that the protrusion cover portion 132 can be simply overlapped thereon. The protrusion cover portion 132 protrudes from a cut of a peripheral rib 121*a*-3 at the high-lever of the step form in the above-described part of the opening edge 121*a*-1 to be overlapped with the protrusion opening edge 121*a*-2. The metal cover 13 has the peripheral edge thereof hooked onto the above-described part of the opening edge 121*a*-1 and the pair of protrusion opening edges 121*a*-2, and is bonded with an adhesive having watertight performance. According to this bonding, as shown in FIG. 3, a watertight bonding portion 13*a* is formed.

Also, according to the present embodiment, in the central cover portion 131 of the metal cover 13, three beads extending in the length direction D11 of the conductor plate 11 are formed. Accordingly, a surface at the refrigerant flow path side in the central cover portion 131 of the metal cover 13 becomes the flow-path-side uneven surface 131*a* on which multiple (three according to the present embodiment) convex portions 131*a*-1 protruding toward the inner side of the refrigerant flow path 1*a* are provided. Corresponding to this configuration, the surface at the conductor plate 11 side in the central cover portion 131 becomes the conductor side uneven surface 131*b* in corresponding to the flow-path-side uneven surface 131*a*.

The pair of refrigerant inlet/outlet ports 14 are portions provided in at least one side of the groove member 12 and the metal cover 13 so as to make the refrigerant to flow to the refrigerant flow path 1*a*, and according to the present embodiment, it is only provided in the metal cover 13. More specifically, the pair of refrigerant inlet/outlet ports 14 become tubular protrusions that are provided to stand in one-to-one correspondence with the pair of protrusion cover portions 132 in the metal cover 13.

Also, according to the present embodiment, the water as the conductive liquid is used as the refrigerant. Then, the insulation processing such as the application of insulation painting and the like is applied on the flow-path-side uneven surface 131*a* toward the inner side of the refrigerant flow path 1*a* in the metal cover 13.

The thermal conduction material 15 is a flexible sheet-like member that is sandwiched between the metal cover 13 and the conductor plate 11 to be in close contact with the metal cover 13 and the conductor plate 11. As an example of this thermal conduction material 15, for example, it is possible to adopt the thermal conduction sheet of Tflex SF600 Series (registered trademark) that is manufactured by Laird Thermal Systems, Inc. As shown in FIG. 3, this thermal conduction material 15 is sandwiched between the conductor plate 11 and the conductor-side uneven surface 131*b* in the central cover portion 131 of the metal cover 13 to be in close contact with the conductor-side uneven surface 131*b* and the conductor plate 11. Then, the conductor plate 11 is overlapped with the end edge of the peripheral rib 121*a*-3 in the groove member 12 surrounding the central cover portion 131 in a state of sandwiching this thermal conduction material 15 and slightly crushing the thermal conduction material 15 therebetween with the conductor-side uneven surface 131*b* of the metal cover 13. The end edge of the peripheral rib 121*a*-3 and the conductor plate 11 are bonded with an adhesive having watertight performance to form a watertight joint portion 111*b*.

According to the conductor member with cooling structure 1 in the above-described embodiment, the heat generated in the electrical/electronic member E1 and transmitted to the conductor plate 11 is transferred to the refrigerant in the refrigerant flow path 1*a* via the metal cover 13 and the thermal conduction material 15 to be cooled. According to this configuration, since the cooling is performed by the refrigerant and the metal cover 13 is only configured to transfer the heat to the refrigerant, it is sufficient to make the metal cover 13, that tends to be heavy, to be formed with a minimum size required such that it is possible to achieve the weight reduction and the miniaturization. Also, in the point in which the light groove member 12 that is made from the resin is combined with the metal cover 13 to configure the refrigerant flow path 1*a*, compared with the case of using the heavy member such as a cooling plate or the like made of the metal with sufficient thickness and width for the heat dissipation, it is possible to suitably achieve the weight reduction and the miniaturization.

Here, according to the present embodiment, part of the opening edge 121*a*-1 in the groove opening 121*a* of the groove member 12 has the concave shape in the step form into which the metal cover 13 can be fitted therein. The conductor plate 11 is bonded to the peripheral portion of the groove opening 121*a* in the state in which the conductor plate 11 is overlapped to this metal plate 13 with the thermal conduction material 15 being sandwiched therebetween. According to this configuration, the metal cover 13 is fitted to part of the opening edge 121*a*-1 in the groove opening 121*a* such that it is possible to limit the size thereof at the same degree with that of the groove opening 121*a* and thus it is possible to further achieve the weight reduction and the miniaturization.

Also, according to the present embodiment, the surface at the refrigerant flow path 1*a* side of the metal cover 13 becomes the flow-path-side uneven surface 131*a*. According to this configuration, by providing the flow-path-side uneven surface 131*a* in the metal cover 13, the contact surface with the refrigerant becomes larger such that it is possible to improve the cooling efficiency.

Also, according to the present embodiment, the surface at the conductor plate 11 side of the metal cover 13 becomes the conductor side uneven surface 131*b*, and the thermal conductor material 15 is sandwiched between the conductor side uneven surface 131*b* and the conductor plate 11 to be in close contact to the two configurations. According to this configuration, by providing the conductor side uneven surface 131*b* in the metal cover 13, the contact surface with the thermal conductor material 15 becomes larger such that it is possible to improve the cooling efficiency.

Also, according to the present embodiment, the pair of refrigerant inlet/outlet ports 14 become the tubular protrusions in one-to-one correspondence with the pair of protrusion cover portions 132 in the metal cover 13. According to this configuration, by providing the refrigerant inlet/outlet ports 14 in the protrusion cover portion 132 being apart from the conductor plate 11 in the metal cover 13, the central cover portion 131 overlapped to the conductor plate 11 satisfyingly contributes to the thermal conduction to the refrigerant such that it is possible to improve the cooling efficiency. Also, by configuring the refrigerant inlet/outlet ports 14 as the tubular protrusions, for example, the connection with the flow paths with other shapes such as the pipe shape or the like becomes available, and it is possible to improve the degree of freedom regarding the connection of the flow paths.

Also, according to the present embodiment, the refrigerant becomes the water as the conductive liquid, and the insulation processing with respect to the refrigerant is applied to the fluid-path-side uneven surface 131*a* toward the inner side of the refrigerant flow path 1*a* in the metal cover 13. According to this configuration, assuming that a situation such as the metal cover 13 comes into contact with the conductor plate 11 occurs, it is possible to definitely prevent the conductor plate 11 from being short-circuited to other parts via the refrigerant due to the insulation processing applied to the metal cover 13.

The above-described embodiment is merely used to show a typical embodiment of the conductor member with cooling structure. The conductor member with cooling structure is not limited thereto and can be implemented as various modifications.

For example, according to the above-described embodiment, as an example of the conductor member with cooling structure, the conductor member with cooling structure 1 for connecting each of the pair of component terminals E11 as the electrical connection target in the relay as the electrical/electronic member E1 is shown. However, the conductor member with cooling structure is not limited thereto, and the electrical/electronic member to be connected may be electrical members other than the relay or other electronic members.

Also, according to the above-described embodiment, as an example of the conductor member with cooling structure, the conductor member with cooling structure 1 being the liquid cooling type in which the water as the conductive liquid flows as the refrigerant in the refrigerant flow path 1*a* is shown. However, the conductor member with cooling structure is not limited thereto, and the refrigerant may be a non-conductive liquid or a gas for air cooling. In a case in which the non-conductive liquid or the gas for air cooling is adopted, the insulation processing on the inner surface of the metal cover for partitioning the refrigerant flow path becomes unnecessary. However, in the case in which the water being the conductive liquid is used as the refrigerant, by applying the insulation processing on the flow-path-side uneven surface 131*a* as the inner surface of the metal cover 13, similar to the above-described embodiment, it is possible to definitely prevent the short circuit between the conductor plate 11 and the other members via the refrigerant.

Also, according to the above-described embodiment, as an example of the conductor member with cooling structure, the conductor member with cooling structure 1 in which the groove member 12 extends along the partial shape 11*a* except for the two end portions of the conductor plate 11 is shown. However, the conductor member with cooling structure is not limited thereto, and it may be a configuration in which the groove member is formed along the whole length of the conductor plate in the strip plate shape.

Also, according to the above-described embodiment, as an example of the conductor member with cooling structure, the conductor member with cooling structure 1 in which both of the pair of refrigerant inlet/outlet ports 14 are provided in the metal cover 13 is shown. However, the conductor member with cooling structure is not limited thereto, and one side of the refrigerant inlet/outlet ports may be provided in either member of the groove member or the metal cover, and the other side of the refrigerant inlet/outlet ports may be provided in the other member thereof. Alternatively, both of the pair of refrigerant inlet/outlet ports may be provided in the groove member.

Also, according to the above-described embodiment, as an example of the conductor member with cooling structure, the conductor member with cooling structure in which part of the opening edge 121*a*-1 in the groove opening 121*a* of the groove member 12 has the concave shape in the step form into which the metal cover 13 is able to be fit is shown. However, the conductor member with cooling structure is not limited thereto, and it is possible to simply overlap and bond the metal cover being wider than the groove opening to the groove opening without providing the concave portion in the step form or the like in the groove opening of the groove member. However, by adopting the structure to provide the concave portion in the step form in part of the opening edge 121*a*-1 of the groove opening 121*a* so as to fit the metal cover 13 therein, as described above, it is possible to further realize the weight reduction and the miniaturization of the conductor member with cooling structure 1. Also, according to the above-described embodiment, it is described that the concave portion in the step form for fitting the metal cover 13 therein is provided only in part of the opening edge 121*a*-1 in the groove opening 121*a*, however, the formation location of the concave portion is not limited thereto, and the concave portion may be provided along the whole circumference of the opening edge.

Also, according to the above-described embodiment, as an example of the metal cover, the metal cover 13 in which the surface at the refrigerant flow path 1*a* side becomes the flow-path-side uneven surface 131*a* is shown. However, the metal cover is not limited thereto, and the metal cover may be a configuration in which the surface at the refrigerant flow path side becomes a flat surface. However, according to the metal cover 13 having the flow-path-side uneven surface 131*a*, as described above, the contact surface with the refrigerant becomes larger such that the cooling efficiency can be improved.

Also, according to the above-described embodiment, as an example of the metal cover, the metal cover 13 in which the surface at the conductor plate 11 side becomes the conductor side uneven surface 131*b* and the thermal conduction material 15 is in close contact with this conductor side uneven surface 131*b* is shown. However, the metal cover is not limited thereto, and the surface at the conductor plate side may be a flat surface. However, according to the metal cover 13 having the conductor side uneven surface 131*b*, as described above, the contact surface with the thermal conduction material 15 becomes larger such that it is possible to improve the cooling efficiency.

Also, according to the above-described embodiment, as an example of the refrigerant inlet/outlet port, the refrigerant inlet/outlet port 14 as the tubular protrusions that are provided to stand in the protrusion cover portions 132, being apart from the conductor plate 11, in the metal cover 13 is shown. However, the refrigerant inlet/outlet port is not limited thereto, and it may be provided to penetrate the conductor plate in the portion overlapping the conductor plate, or the shape thereof may be a square tubular shape or the like rather than the tubular protrusion. However, as described above, by providing the refrigerant inlet/outlet ports 14 as the tubular protrusions in the protrusion cover portions 132 being apart from the conductor plate 11, it is possible to improve the cooling efficiency, and by forming the refrigerant inlet/outlet 14 as the tubular protrusion, the degree of freedom regarding the flow path connection can be improved.

REFERENCE SIGNS LIST

1 conductor member with cooling structure
1*a* refrigerant flow path
11 conductor plate
11*a* partial shape
11*b*, 13*a* watertight bonding portion
12 groove portion
13 metal cover
14 refrigerant inlet/outlet port
15 thermal conduction material
111 screw penetration hole
121 flow path groove
121*a* groove opening
121*a*-1 opening edge
121*a*-2 protrusion opening edge
121*a*-3 peripheral rib
122 central groove portion
123 protrusion groove portion
131 central cover portion
131*a* flow-path-side uneven surface
131*a*-1 convex portion
131*b* conductor side uneven surface
132 protrusion cover portion
D11 length direction
D12 width direction
E1 electrical/electronic member
E11 component terminal

What is claimed is:

1. A conductor member with cooling structure, comprising:

a conductor plate formed of a conductive metal in a stripe shape, wherein one end side is connected to a component terminal of a predetermined electrical/electronic member, and the other end side is connected to an electrical connection target of the electrical/electronic member to be energized;

a groove member formed of an insulation resin, having a shape in which a flow path groove configuring part of a refrigerant flow path in which refrigerant flows and extending along at least a partial shape of the conductor plate in a length direction;

a metal cover as a cover made from metal to configure the refrigerant flow path by blocking a groove opening of the flow path groove in the groove member, the metal cover being overlapped by the conductor plate;

a pair of refrigerant inlet/outlet ports provided in at least one side of the groove member and the metal cover for the refrigerant to flow in the refrigerant flow path; and a thermal conduction material being sandwiched between the metal cover and the conductor plate to be in close contact with the metal cover and the conductor plate.

2. The conductor member with cooling structure according to claim 1, wherein in the groove member, at least part of opening edge in the groove opening has a concave shape in step form in which the metal cover is able to be fit, and the conductor plate is bonded to a peripheral portion of the groove opening of the groove member in a state in which the conductor plate is overlapped by the metal cover to sandwich the thermal conduction material therebetween.

3. The conductor member with cooling structure according to claim 1, wherein a surface of the metal cover at the refrigerant flow path side is formed as an uneven surface.

4. The conductor member with cooling structure according to claim 1, wherein a surface of the metal cover at the conductor plate side is formed as an uneven surface, and the thermal conduction material is sandwiched between the uneven surface at the conductor plate side and the conductor plate to be in close contact with the uneven surface at the conductor plate side and the conductor plate.

5. The conductor member with cooling structure according to claim 1, wherein the flow path groove in the groove member has a pair of protrusion groove portions being apart from the conductor plate to protrude, and the pair of refrigerant inlet/outlet ports are tubular protrusions being provided to stand in one-to-one correspondence to a pair of protrusion cover portions which block the pair of protrusion groove portions in the metal cover.

6. The conductor member with cooling structure according to claim 1, wherein the refrigerant is a conductive liquid, and in the metal cover, an insulation processing with respect to the refrigerant is applied on a surface toward an inner side of the refrigerant flow path.

* * * * *